(12) United States Patent
Schmidt et al.

(10) Patent No.: US 7,407,235 B2
(45) Date of Patent: Aug. 5, 2008

(54) METHOD FOR IMPROVING THE CONTROL BEHAVIOR OF A CONTROLLED VEHICLE BRAKING SYSTEM

(75) Inventors: Robert Schmidt, Rennerod (DE); Dieter Burkhard, Bingen Büdesheim (DE); Micro Loos, Elversberg (DE); Christina Lorang, Langen (DE)

(73) Assignee: Continental Teves AG & Co.

(*) Notice: Subject to any disclaimer, the term of this patent is extended or adjusted under 35 U.S.C. 154(b) by 454 days.

(21) Appl. No.: 10/472,594

(22) PCT Filed: Mar. 6, 2002

(86) PCT No.: PCT/EP02/02433

§ 371 (c)(1),
(2), (4) Date: Aug. 4, 2004

(87) PCT Pub. No.: WO02/081278

PCT Pub. Date: Oct. 17, 2002

(65) Prior Publication Data

US 2004/0256913 A1 Dec. 23, 2004

(30) Foreign Application Priority Data

Mar. 20, 2001 (DE) ............................... 101 13 578
Nov. 28, 2001 (DE) ............................... 101 58 263

(51) Int. Cl.
*B60T 8/24* (2006.01)
*B60B 39/00* (2006.01)
(52) U.S. Cl. ................. 303/139; 303/113.2; 701/82
(58) Field of Classification Search ............... 303/139, 303/145, 146, 167, 189, 113.2; 701/71, 82
See application file for complete search history.

(56) References Cited

U.S. PATENT DOCUMENTS

| 3,871,467 | A | * | 3/1975 | Senft et al. | ............... | 180/359 |
| 5,333,711 | A | * | 8/1994 | Beigang | ............... | 192/71 |
| 6,616,250 | B1 | * | 9/2003 | Fennel et al. | ............... | 303/139 |
| 6,705,685 | B1 | * | 3/2004 | Halat et al. | ............... | 303/141 |

FOREIGN PATENT DOCUMENTS

| DE | 3741247 | 5/1989 |
| DE | 4102301 | 6/1992 |
| DE | 4300048 | 10/1994 |
| DE | 4435448 | 4/1995 |
| DE | 19521086 | 12/1996 |
| DE | 19651968 | 6/1998 |
| DE | 19935805 | 2/2000 |

(Continued)

*Primary Examiner*—Melody M Burch

(57) ABSTRACT

The present invention relates to a method for improving the control behavior of a controlled automotive vehicle system, in particular an anti-lock brake system (ABS), a driving stability control system (ESP), or another brake system extended by other functionalities, wherein evaluated wheel dynamics data (dyn) and evaluated wheel slip data (slip) are taken into account as a criterion for the initiation of a control intervention for each individual wheel, and the sum thereof is compared to a control threshold ($\psi$).

For a better weighting of wheel dynamics and slip, the invention discloses determining evaluation parameters ($\alpha$, $\beta$) that can be modified in response to driving conditions and taking them as a reference in the evaluation of the wheel dynamics data (dyn) and in the evaluation of the wheel slip data (slip).

12 Claims, 3 Drawing Sheets

FOREIGN PATENT DOCUMENTS

| | | | |
|---|---|---|---|
| DE | 19923012 A1 * | 11/2000 | |
| DE | 19958492 | 6/2001 | |
| DE | 19958772 | 6/2001 | |
| WO | 9203314 | 3/1992 | |
| WO | WO-9955585 A1 * | 11/1999 | |
| WO | WO-0051861 A1 * | 9/2000 | |

* cited by examiner

METHOD FOR IMPROVING THE CONTROL BEHAVIOR OF A CONTROLLED VEHICLE BRAKING SYSTEM

BACKGROUND OF THE INVENTION

The present invention relates to a method for improving the control behavior of a controlled automotive vehicle system, in particular an anti-lock brake system (ABS; ESBS: Enhanced Stability Brake System), a driving stability control system (ESP), or another brake system extended by other functionalities, wherein evaluated wheel dynamics data (dyn) and evaluated wheel slip data (slip) are taken into account as a criterion for the initiation of a control intervention for each individual wheel, and the sum thereof is compared to a control threshold ($\psi$).

In up-to-date ABS brake systems, a control cycle is entered or a control phase change initiated after a control threshold has been exceeded in dependence on the wheel rotational behavior. Predetermined criteria permit defined transitions from one control phase into a subsequent control phase. The control thresholds for entry into an ABS control cycle and the criteria for changing from one control phase into another control phase are based on the wheel slip or the wheel acceleration for each individual wheel, or on a combination of both values (wheel criterion). When a wheel e.g. shows tendencies to run into slip and when, simultaneously, certain predefined deceleration thresholds are exceeded, an ABS control cycle will be initiated. A pressure-maintaining phase or a pressure reduction phase is introduced, depending on the extent of the slip tendency.

A combined control based on acceleration and slip is disclosed e.g. in the handbook 'Fahrwerktechnik' (chassis technology), first edition 1993, Wuerzburg, Vogel Verlag (publishing house), page 123 ff. Wheel braking and relative slip are weighted individually for each wheel by way of constant parameters, subtracted from each other, and the so obtained wheel criterion is compared with a control threshold for initiating a control phase or a change of control phase.

An objective is to improve the combined control based on wheel dynamics (acceleration) and slip. It is particularly desired to indicate measures that allow an improved weighting of wheel dynamics and slip.

SUMMARY OF THE INVENTION

This object is achieved by determining evaluation parameters that can be modified in response to driving conditions and taking them as a reference in the evaluation of the wheel dynamics data and in the evaluation of the wheel slip data. Subsequently, weighting parameters are adaptively modified in dependence on the longitudinal force prevailing between tires and roadway.

The present invention especially allows an improved adaptation of the control characteristics to the given characteristics of the tires. This is because summer tires and winter tires have greatly differing braking characteristics. Winter tires show a stable rotational behavior also in ranges with great slip so that the slip criterion can be given greater attention, and the wheel dynamics is of subordinate significance. Summer tires show a contact-breaking tendency, more specifically a tendency to instability, in the range with great slip. Wheel dynamics should be given greater attention before contact-breaking occurs. The control characteristics is conformed adaptively, meaning automated in dependence on the prevailing state of travel and the driving conditions (especially the currently prevailing longitudinal force between tires and roadway).

The invention achieves the following favorable effects:

With high yet stable slip values at low wheel dynamics, the initiation of a pressure reduction phase may be delayed (winter tire characteristics).

With low slip but high wheel dynamics it is possible to introduce a pressure reduction phase earlier than previously (summer tire characteristics).

A more sensitive pressure reduction control threshold may be provided with respect to steering movements and a related reduction of the longitudinal force. The increase in lateral force connected thereto leads to a more stable driving situation.

The use of ESBS functionalities for the modification of evaluation parameters.

The wheel-individual calculation of the control thresholds permits achieving an unsymmetrical control between the axles (e.g. more sensitive control of the rear axle) or different slowing down of curve-inward and curve-outward wheels in a cornering maneuver.

Further details of the invention can be taken from the following description making reference to the accompanying drawings.

DETAILED DESCRIPTION OF THE DRAWINGS

The present invention is based on a calculation of the longitudinal forces currently prevailing between tires and roadway, in particular according to the method disclosed in patent application DE 101 46 950.0. Accordingly, the currently prevailing longitudinal force is obtained for each individual wheel on the basis of measured wheel braking pressure data and the slip.

Principally $$\alpha \cdot slip - \beta \cdot dyn \geq \psi$$

applies as a criterion for entry into a control phase.

$\alpha, \beta$: evaluation parameters slip: wheel slip data:

dyn: wheel dynamics data $\psi$: control threshold

The control threshold ψ is used as a criterion of decision for the initiation of a control intervention or change of control phase. If a wheel criterion (the entire left side of the inequation) exceeds or falls below threshold ψ, a control intervention is initiated. The wheel criterion is determined individually for each wheel and is composed of the sum of slip data slip weighted by way of an evaluation parameter α and wheel dynamics data dyn weighted by way of an evaluation parameter β. The two weighted data slip and dyn are subtracted from one another for obtaining the wheel criterion.

For different braking situations differently modified control thresholds are provided. The term ≧2 applies during ABS control to initiate pressure reduction for the right-hand side of the above condition. Pressure reduction takes place when the sum of evaluated wheel slip data and evaluated wheel dynamics data is ≧$\psi_2$. Criterion <$\psi_4$ applies for a pressure-maintaining phase within an ABS control cycle. A pressure-maintaining phase is introduced when the sum of evaluated wheel slip data and evaluated wheel dynamics data (i.e. the wheel criterion) is <$\psi_4$.

If the wheel concerned is outside an ABS control cycle, the criterion ≧$\Psi_{20}$ applies for the initiation of a first pressure reduction phase (upon entry into the control). Pressure reduction is initiated when the wheel criterion is ≧ the control threshold $\psi_{20}$.

Figure 4:
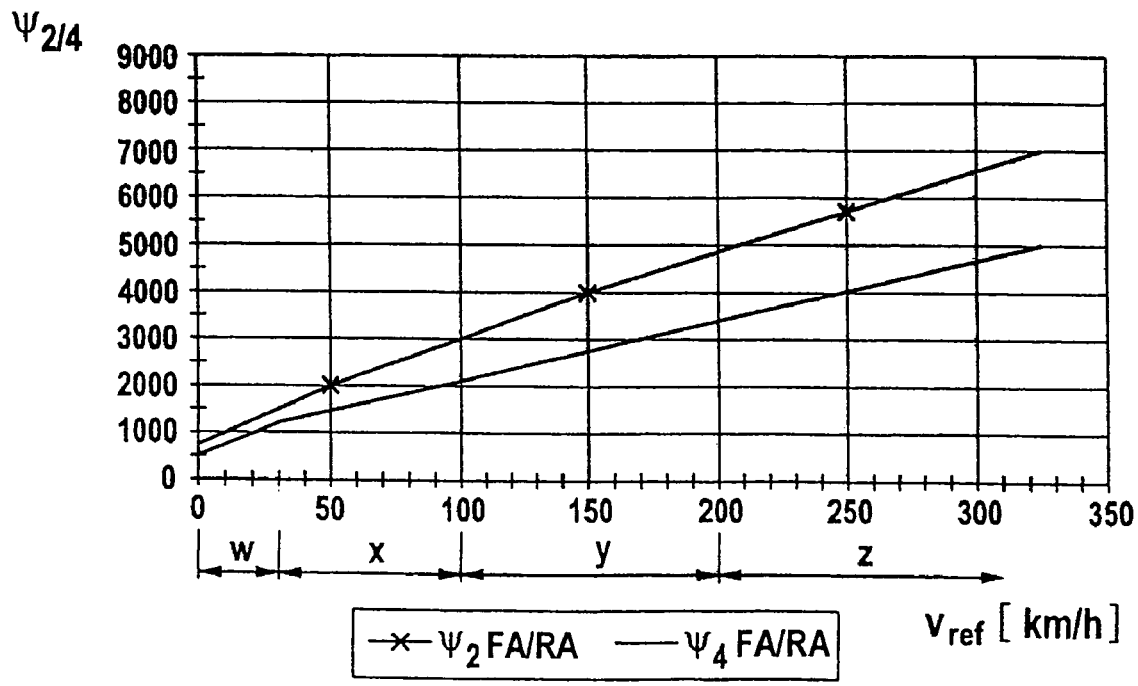
FIG. 4 shows control threshold variations $\psi$ for a pressure reduction phase (phase 2) or a pressure-maintaining phase (phase 4) with a prevalent ABS control cycle in dependence on the vehicle reference speed.

FIG. 4 illustrates the control thresholds $\Psi_2$/$\Psi_4$ for reducing pressure and maintaining pressure in each case in dependence on the vehicle reference speed $v_{Ref}$. The control thresholds are equal in each case for the wheels of the front axle and for the wheels of the rear axle and rise substantially linearly with increasing reference speed. As is apparent, the control threshold gradient changes for determined speed ranges w, x, y, z. A normal range x, y(30-200 km/h) has a normal gradient. In the speed range w up to roughly 30 km/h the gradient is increased compared to the normal range, and a reduced gradient is provided in the speed range z starting from 200 km/h approximately. This will improve driving comfort in the low speed range w and driving stability in the high speed range z.

Figure 3:
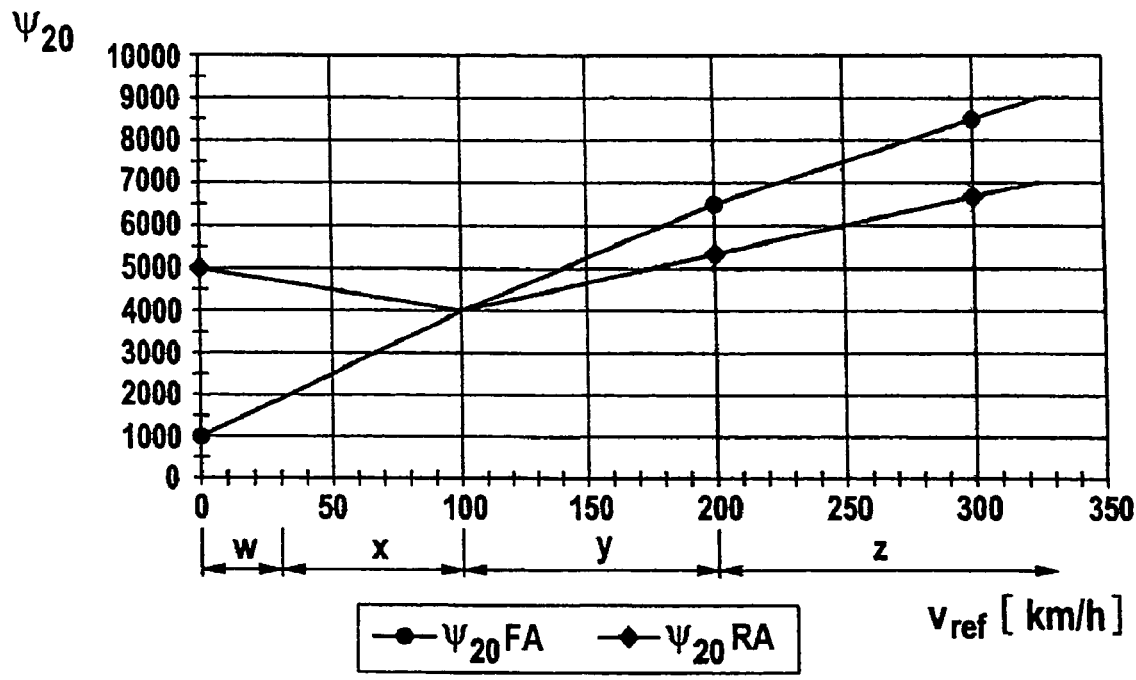
FIG. 3 shows control threshold variations $\psi$ for a pressure reduction phase (phase 2) in a braking situation without control intervention for front axle and rear axle in dependence on the vehicle reference speed $v_{ref}$.

Without control intervention, FIG. 3 is the basis for the control thresholds for pressure reduction (phase 2). As can be seen, the qualitative control threshold variation for the front axle also with respect to the individual speed ranges w, x, y, z and gradients, essentially coincides with the control threshold variation $\psi_{2\ FA/RA}$ of FIG. 4. The position of the control threshold $\psi_{20\ FA}$ is, however, in total shifted quantitatively in an upward direction for a more sensitive control. Starting from an initial value in a range of lower to medium vehicle reference speed w, x, the control threshold $\Psi_{20\ RA}$ for pressure reduction at the rear axle is lowered substantially linearly until a minimum. In a range of increased and high vehicle reference speed y, z, the control threshold is raised essentially linearly. This supports the driving comfort in the range w, x and driving stability in the range y, z.

Figure 5:
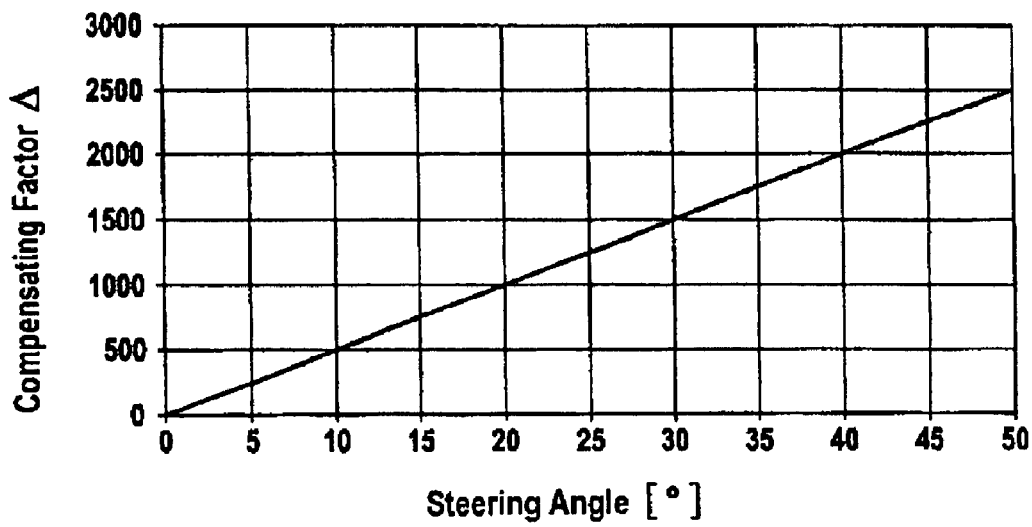
FIG. 5 shows a compensating factor $\Delta$ responsive to the steering angle.
Figure 6:
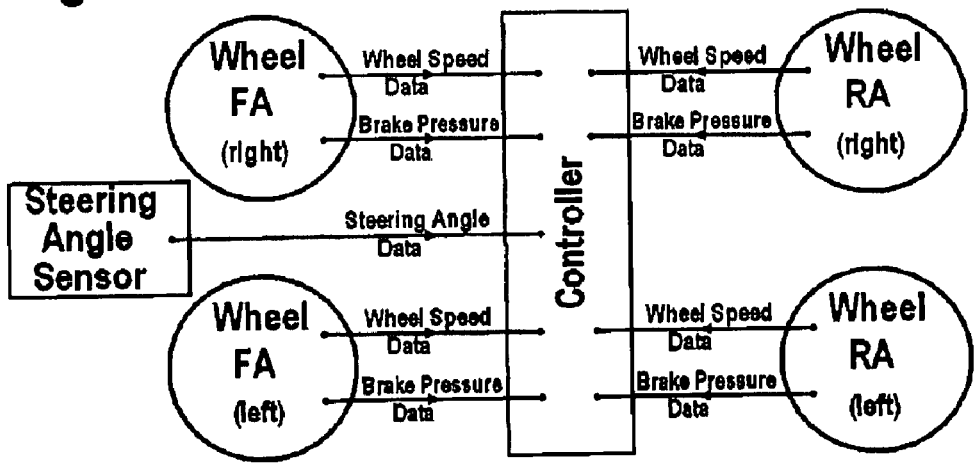
FIG. 6 is a schematic depiction of an example of a hardware arrangement that could be used to implement the methods of the present invention.

To take the influences of a cornering maneuver into consideration, the control thresholds $\Psi_{2\ RA,FA}$, $\Psi_{20\ RA}$, $\psi_{20\ FA}$, $\Psi_{4\ RA,FA}$, as can be seen from FIG. 5, are incremented by a compensating factor (offset) Δ that is responsive to the steering angle. The compensating factor Δ rises substantially linearly with increasing steering angle and leads to an additionally sensitized control.

Hereinbelow follows the evaluation of the wheel slip data slip and the evaluation of the wheel dynamics data dyn in detail. In general, the evaluation is executed on the basis of a longitudinal force between tires and roadway that is calculated, or otherwise determined. The longitudinal force may be calculated by measuring the wheel braking pressure and the wheel rotational speed and by evaluating the balance of torques at the wheel. The calculated longitudinal force is a standard of the coefficient of friction between tires and roadway because these two quantities are linked to each other by way of the tire contact (μ=L/N). Details in this regard may be taken from patent application DE 101 46 950.0, its disclosure being. fully taken into account in this context.

The evaluation of the slip and dynamics data is explained more closely in the following. As slip data slip the difference between ABS reference speed and wheel speed calculated in ABS control is used. As wheel dynamics data dyn a so-called DVN signal available from other functionalities may be used.

The DVN signal is a speed signal being found by integration of the wheel acceleration ACC determined from the measured wheel speed with a feedback $a_{GK}$. Thus, the DVN signal represents a difference speed to a virtual reference line with the gradient of the feedback $a_{GK}$. It serves as a criterion for decision when determining various phases of the ABS control. The formula for determining the DVN signal reads:

$$DVN(n) = \sum_{i=1}^{n}(ACC(i) - a_{GK})\Delta t + DVN_0$$

Figure 1:
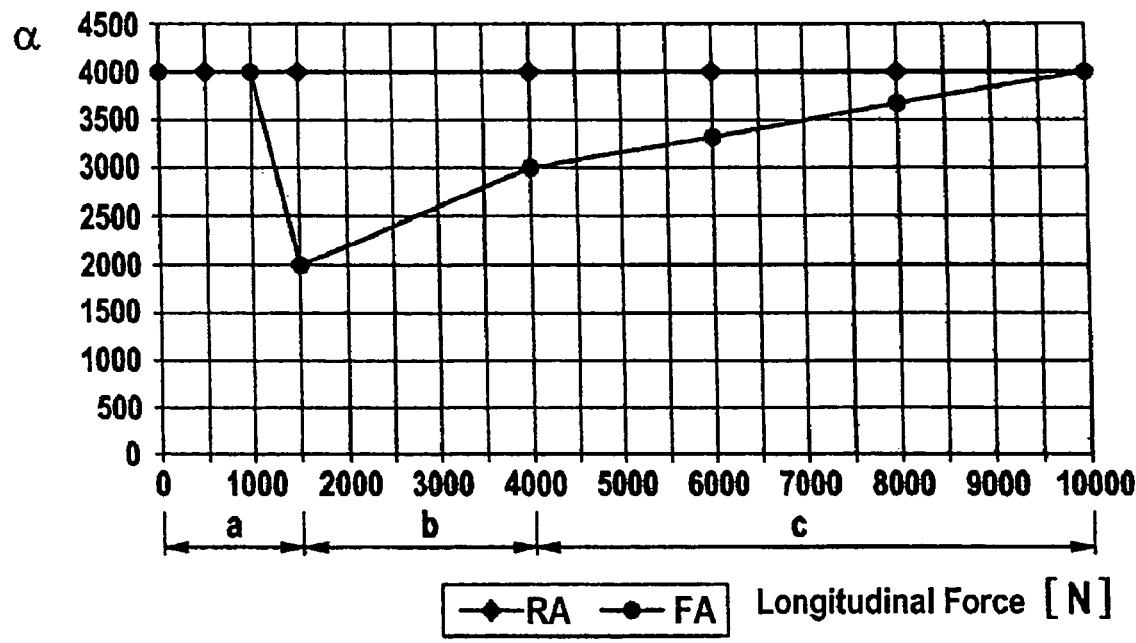
FIG. 1 is a wheel-slip-responsive weighting parameter $\alpha$ for a front axle (FA) and a rear axle (RA) in dependence on the longitudinal force.
Figure 2:
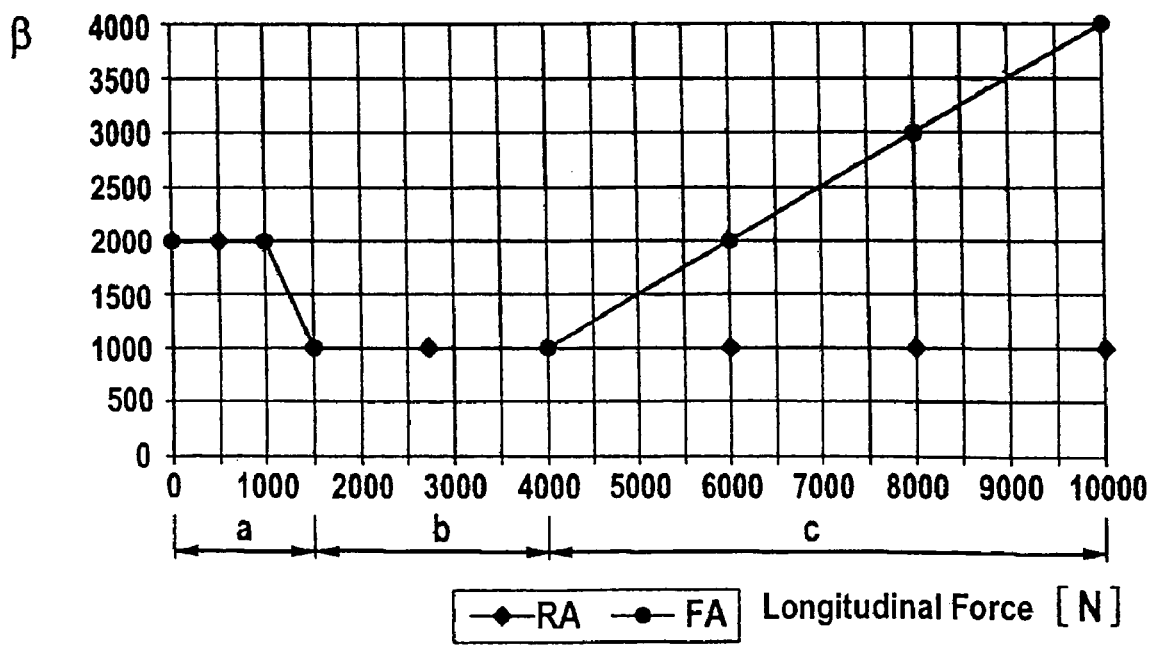
FIG. 2 is a weighting parameter $\beta$ responsive to wheel dynamics for a front axle (FA) and a rear axle (RA) in dependence on the longitudinal force.

The two difference signals (slip and dyn/DVN) are based on subtraction with different references (speed reference or acceleration reference). The evaluation parameters α and β are determined in dependence on the prevailing longitudinal force. This is illustrated in FIG. 1 and FIG. 2. An increased weighting parameter principally causes a more pronounced weighting of the respective portion within the wheel criterion, while a reduction of the weighting parameter causes degressive weighting.

The evaluation parameter α serves for weighting the slip data slip. The maximally transmittable longitudinal force at the wheel determines the magnitude of the evaluation parameter α. The slip influence on the control entry is modified by way of the evaluation parameter α in dependence on different longitudinal forces (change in coefficient of friction, steering movements, cornering maneuver). For simplification, the longitudinal forces may principally be subdivided into three ranges a, b, c, meaning range a of low longitudinal forces, range b of medium longitudinal forces, and range c of high longitudinal forces. Range b may also be referred to as transition range. As FIG. 1 shows, the evaluation parameter α at the rear axle is equal for all longitudinal force ranges a, b, c (friction values) because the rear axle shall be controlled sensitively in order to improve driving stability. This takes into account the physical characteristics of driving, i.e., that the rear axle contributes especially to the directional stability of a vehicle.

For the front axle the evaluation parameter α in the range a—starting from an initial value—is constant to begin with, and is greatly lowered substantially linearly to a minimum value until the end of the range α. A substantially linear increase of the evaluation parameter α will follow in the longitudinal force ranges b and c. As shown in FIG. 1, the (negative) gradient in range a is highest, followed by the gradient in range b and range c. This course takes into account the physical characteristics, meaning that great decelerations entail a load shift in the front axle's direction only low slip shall be allowed for this case. The evaluation parameter β is used to weight the wheel dynamics data dyn. The maximally transmittable longitudinal force at the wheel limits the magnitude of the evaluation parameter β. Like with the evaluation parameter α the influence of dynamics is modified in dependence on the longitudinal forces. As can be taken from FIG. 2, the evaluation parameter β in the lower range of longitudinal force a for the rear axle RA and the front axle FA is initially constant and is lowered substantially linearly to a minimum until the end of said range. More specifically, β is congruent in the ranges of the longitudinal force a and b for front axle and rear axle. The evaluation parameter β for the front axle rises substantially linearly in the range c. For the rear axle, the evaluation parameter β also remains constant in the range of the longitudinal force c. The variation of the evaluation parameter β—exactly as the variation of the evaluation parameter α—contributes that there is a sensitive control, especially at great decelerations.

The present invention is not limited to hydraulic brake systems. Its implementation in electrohydraulic brake systems (EHB) or electro-mechanical brake systems (EMB) is easily possible.

The invention claimed is:

1. A method for improving the control behavior of a controlled automotive vehicle system,
    wherein evaluated wheel dynamics data (dyn) and evaluated wheel slip data (slip) are taken into account as a criterion for the initiation of a control intervention for each individual wheel, and the sum thereof is compared to a control threshold ($\psi$),
    wherein evaluation parameters ($\alpha,\beta$) that can be modified in response to driving conditions are determined and taken as a reference in the evaluation of the wheel dynamics data (dyn) and in the evaluation of the wheel slip data (slip),
    wherein the evaluation parameters ($\alpha,\beta$) are modified in dependence on a longitudinal force prevailing between tires and roadway,
    wherein the control threshold includes first and second control thresholds ($\psi_{2\ RA,FA}$, $\psi_{20\ FA}$) relating to a pressure reduction and a third control threshold ($\psi_{4\ RA,FA}$) relating to maintaining pressure wherein said first, second, and third thresholds will rise approximately linearly with an increasing vehicle reference speed.

2. The method as claimed in claim 1,
    wherein the evaluation parameters ($\alpha,\beta$) are derived from data of a driving stability system and/or an enhanced stability brake system.

3. The method as claimed in claim 1,
    wherein said longitudinal forces are categorized into three degrees of magnitude—
    wherein said three degrees of magnitude include (a) low, (b) transitional, and (c) great,
    wherein the evaluation parameters ($\alpha,\beta$) for wheel dynamics (dyn) and wheel slip (slip) are substantially constant, or rise linearly for longitudinal forces categorized as transitional.

4. The method as claimed in claim 1,
    wherein one of said evaluation parameters ($\alpha$) is associated with wheel slip (slip) of the wheels of a rear axle (RA) of said vehicle, and wherein one of said evaluation parameters ($\alpha$) is substantially constant for all longitudinal forces exerted upon said wheels of said rear axle (RA).

5. The method as claimed in claim 1,
    wherein said longitudinal forces are categorized into three degrees of magnitude—wherein said three degrees of magnitude include (a) low, (b) transitional, and (c) great,
    wherein the one of said evaluation parameters ($\beta$) is associated with the wheel dynamics (dyn) of the wheels of a front axle (FA) of the vehicle, and wherein one of said evaluation parameters ($\beta$) assumes a constant value for longitudinal forces categorized as transitional (b), and wherein the evaluation parameter ($\beta$) is greater than said constant value for longitudinal forces categorized as low and for longitudinal forces categorized as great.

6. The method as claimed in claim 1, wherein said first threshold ($\psi_{2\ RA,FA}$) relates to pressure reduction used when an active anti-lock brake control (ABS) is decreased quantitatively compared to said second control threshold ($\psi_{20\ FA}$), when the anti-lock brake control (ABS) is inactive.

7. The method as claimed in claim 1,
    wherein for the wheels of a rear axle (RA), while anti-lock brake control (ABS) is inactive; a separate control threshold ($\psi_{20\ RA}$) for pressure reduction is provided,
    wherein the separate control threshold ($\psi_{20\ RA}$) starting from an initial value in a range of low to medium vehicle reference speed (w,x) is lowered approximately linearly toward a minimum, and
    wherein the control threshold ($\psi_{20\ RA}$) in a range of increased and high vehicle reference speed (y,z) is approximately linearly raised.

8. The method as claimed in claim 1,
    wherein the control thresholds ($\psi_{2\ RA,FA}$, $\psi_{20\ RA}$, $\psi_{20\ FA}$, $\psi_{4\ RA,FA}$) are incremented by a compensating factor ($\Delta$) responsive to a steering angle.

9. The method as claimed in claim 8,
    wherein the compensating factor ($\Delta$) is raised linearly with an increasing steering angle.

10. The method as claimed in claim 1,
    wherein the evaluation parameters ($\alpha,\beta$) for wheel dynamics (dyn) and wheel slip (slip) are substantially constant, or rise linearly for longitudinal forces categorized as great.

11. A method for improving the control behavior of a controlled automotive vehicle system,
    wherein evaluated wheel dynamics data (dyn) and evaluated wheel slip data (slip) are taken into account as a criterion for the initiation of a control intervention for each individual wheel, and the sum thereof is compared to a control threshold ($\psi$),
    wherein evaluation parameters ($\alpha,\beta$) that can be modified in response to driving conditions are determined and taken as a reference in the evaluation of the wheel dynamics data (dyn) and in the evaluation of the wheel slip data (slip),
    wherein the evaluation parameters ($\alpha,\beta$) are modified in dependence on a longitudinal force prevailing between tires and roadway,
    wherein one of said evaluation parameters ($\beta$) is associated with wheel dynamics (dyn) of the wheels of a rear axle (RA) of the vehicle, and wherein said evaluation parameter ($\beta$) assumes a substantially constant value for longitudinal forces categorized as transitional and great, and is greater than said substantially constant value for longitudinal forces categorized as low (a).

12. A method for improving the control behavior of a controlled automotive vehicle system,
    wherein evaluated wheel dynamics data (dyn) and evaluated wheel slip data (slip) are taken into account as a criterion for the Initiation of a control intervention for each individual wheel, and the sum thereof is compared to a control threshold ($\psi$),
    wherein evaluation parameters ($\alpha,\beta$) that can be modified in response to driving conditions are determined and taken as a reference in the evaluation of the wheel dynamics data (dyn) and in the evaluation of the wheel slip data (slip),
    wherein the evaluation parameters ($\alpha,\beta$) are modified in dependence on a longitudinal force prevailing between tires and roadway, wherein the evaluation parameters ($\alpha,\beta$) for wheel dynamics (dyn) and wheel slip (slip) are substantially constant, or drop linearly for longitudinal forces categorized as low and wherein one of said evaluation parameters ($\beta$) is associated with wheel dynamics (dyn) of the wheels of a rear axle (RA) of the vehicle, and wherein one of said evaluation parameters ($\beta$) assumes a substantially constant value for longitudinal forces categorized as transitional and great and is greater than said substantially constant value for longitudinal forces categorized as low (a).

* * * * *